United States Patent
Loew

(10) Patent No.: US 7,248,747 B2
(45) Date of Patent: Jul. 24, 2007

(54) METHOD AND ARRANGEMENT FOR THE CORRECTION OF VIDEO SIGNALS

(75) Inventor: Andreas Loew, Gross-Gerau (DE)

(73) Assignee: Thomson Licensing, Boulogne-Billancourt (FR)

(*) Notice: Subject to any disclaimer, the term of this patent is extended or adjusted under 35 U.S.C. 154(b) by 707 days.

(21) Appl. No.: 10/657,361

(22) Filed: Sep. 8, 2003

(65) Prior Publication Data

US 2004/0135897 A1    Jul. 15, 2004

(30) Foreign Application Priority Data

Sep. 12, 2002  (DE) ................................. 102 42 516

(51) Int. Cl.
  *G06K 9/40*  (2006.01)
  *G06K 9/34*  (2006.01)
  *G06K 9/48*  (2006.01)

(52) U.S. Cl. ..................................... 382/254; 382/266

(58) Field of Classification Search ................ 382/173, 382/254, 266–269; 348/243, 245, 257, 251; 358/529, 463, 461, 474, 482, 483, 497
See application file for complete search history.

(56) References Cited

U.S. PATENT DOCUMENTS 5,519,441 A * 5/1996 Gusmano et al. ...... 348/207.99
7,053,941 B1 * 5/2006 Ohashi ....................... 348/243
2001/0030770 A1 * 10/2001 Ohashi ....................... 358/465
2002/0176634 A1 * 11/2002 Ohashi ....................... 382/275

FOREIGN PATENT DOCUMENTS

JP          211297      8/2001
JP       P2000-1694     8/2001

* cited by examiner

*Primary Examiner*—Yon J. Couso
(74) *Attorney, Agent, or Firm*—Joseph J. Laks; Ronald H. Kurdyla; Joseph J. Opalach

(57) ABSTRACT

In a method for the correction of video signals whose processing is distributed between a plurality of segments having different transfer characteristics, it is provided that, from values in each case of a predetermined number of pixels before the boundary of two segments, the value of at least one pixel lying after the boundary is estimated in each case, and that correction values are derived from differences between the at least one estimated value and the actual value of the at least one pixel of the following segment that lies after the boundary.

11 Claims, 3 Drawing Sheets

METHOD AND ARRANGEMENT FOR THE CORRECTION OF VIDEO SIGNALS

TECHNICAL FIELD

The invention relates to a method and an arrangement for the correction of video signals whose processing is distributed between a plurality of segments having different transfer characteristics.

BACKGROUND OF THE INVENTION

In order to obtain a higher resolution or number of pixels, linear-array optoelectronic transducers are composed of a plurality of segments, preferably two segments. Both the actual optoelectronic transducers themselves and the circuits for reading out and amplifying the video signals exhibit manufacturing tolerances which affect the linearity, the gain and an offset (black value). This means that the various segments of an electronic transducer applied on an integrated circuit also have different transfer characteristics. At the boundary between two segments, in particular, these differences may be visible, and thus disturbing, during the reproduction of films or other scanned pictures.

SUMMARY OF THE INVENTION

A correction of video signals exhibiting errors of this type is performed in the method according to the invention by virtue of the fact that, from values in each case of a predetermined number of pixels before the boundary of two segments, the value of at least one pixel lying after the boundary is estimated in each case, and that correction values are derived from differences between the at least one estimated value and the actual value of the at least one pixel of the following segment that lies after the boundary.

The errors mentioned in the introduction can be automatically corrected by the method according to the invention, so that no differences between the segments are discernible in the reproduced picture. In the present connection, value is tantamount to "sample".

In the method according to the invention, it is preferably provided that only differences which do not exceed a predetermined value are used for forming the correction values. This prevents signal jumps which reproduce edges actually present in the picture from influencing the formation of the correction values.

For the further connection of disturbing signal jumps in the region of the boundary, it may be provided that, furthermore, the differences are only used for forming the correction values if differences in the values of the predetermined number of pixels before the boundary are less than a predetermined value.

One development of the method according to the invention consists in the fact that the differences, for the purpose of forming the correction values, are averaged separately according to the respective values of the video signals. This development enables the correction of linearity errors in an advantageous manner.

The method according to the invention can already be employed advantageously if only the width [sic] of the pixels on one side of the boundary are used for estimating the values of the pixels on the other side.

A more accurate formation of the correction signals results, however, with the aid of one development of the method according to the invention by virtue of the fact that the temporal order of the predetermined number of pixels after the boundary of two segments is interchanged in each case, that the value of the at least one last pixel before the boundary is estimated from the interchanged values, that further differences are formed from the value estimated for the at least one last pixel lying before the boundary and the actual value of the at least one last pixel lying before the boundary, that an average value is in each case formed from the differences and the further differences, and that the correction value is derived from the average values.

This development may preferably be configured in such a way that the differences and the further differences are in each case subtracted from one another, and that the respective average value of the differences is only used for correction if the value produced by subtraction of the difference and the further difference is less than a further predetermined value. As a result, estimated values are also precluded from use for forming the correction values if the two estimates lead to significantly different results, which may possibly be the case in the region of edges.

In this development, too, the correction signals can be formed separately according to values in particular by virtue of the fact that the average values of the differences, for the purpose of forming the correction values, are averaged separately according to the respective values of the video signals.

In principle, the method according to the invention makes it possible to correct the signals of one of the segments and thus adapt them to the signals of the respective other segment. To that end, in one development of the invention it is provided that the correction values are written to a memory, and that the correction values, depending on the respective values of the video signals of at least one segment to be corrected, are read from the memory and applied to the video signals of the at least one segment to be corrected.

The method according to the invention also enables the two adjoining segments to be corrected to an extent such that they match one another. To that end, in another development it is provided that the correction values are written to a memory, and that the correction values, depending on the respective values of the video signals, are read from the memory and added half each with an opposite sign to the values of the video signals of the adjoining segments.

The estimation of the value of the pixel respectively lying on the other side of the boundary may preferably be effected by virtue of the fact that a first derivative of the video signal is formed by difference formation between values of in each case two adjacent pixels of n pixels, that a second derivative is formed by difference formation of the values of the first derivative, up to a (n−1)th derivative, and that the values of all the derivatives are added and form the estimated value for a following pixel. This method is also suitable for estimations other than in the method according to the main claim.

BRIEF DESCRIPTION OF THE DRAWING

An exemplary embodiment of the invention is illustrated in the drawing on the basis of several figures and explained in more detail in the description below. In the figures.

Although the exemplary embodiment and parts thereof are illustrated as block diagrams, this does not mean that the arrangement according to the invention is restricted to a realization with the aid of individual circuits corresponding to the blocks. Rather, the arrangement according to the invention can be realized particularly advantageously with the aid of large scale integrated circuits. In this case, it is possible to use digital signal processors which, given suitable programming, carry out the processing steps illustrated in the block diagrams.

DESCRIPTION OF AN EXEMPLARY EMBODIMENT

Figure 1:
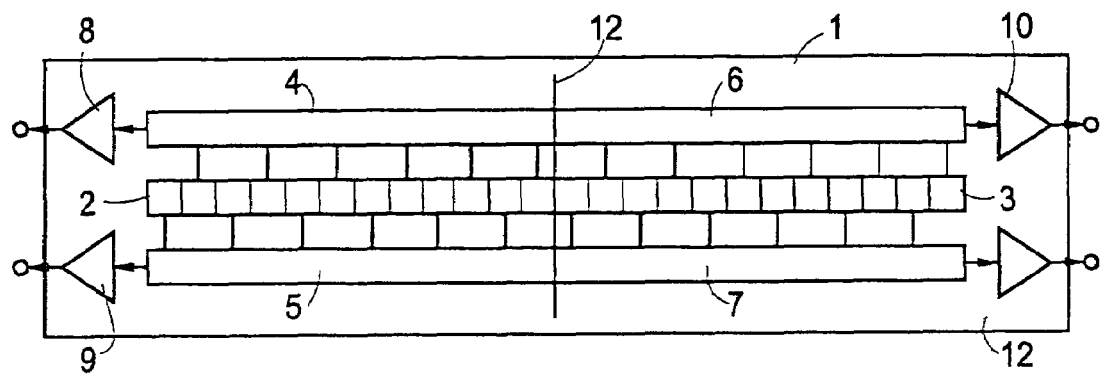
FIG. 1 schematically shows an optoelectronic linear-array sensor.

FIG. 1 shows, in highly schematic form, a linear optoelectronic transducer of the kind used in film scanners, in which a line of optical sensors is composed of two segments 2, 3. The charges respectively corresponding to the brightness of a pixel are transmitted in parallel from the individual sensors into registers 4, 5, 6, 7 and are read serially from the latter. In this case, one of the registers 4 and 5, and 6 and 7, respectively, is used pixel by pixel in multiplex. However, an explanation of this multiplex method is not necessary for an understanding of the present invention.

Figure 3:
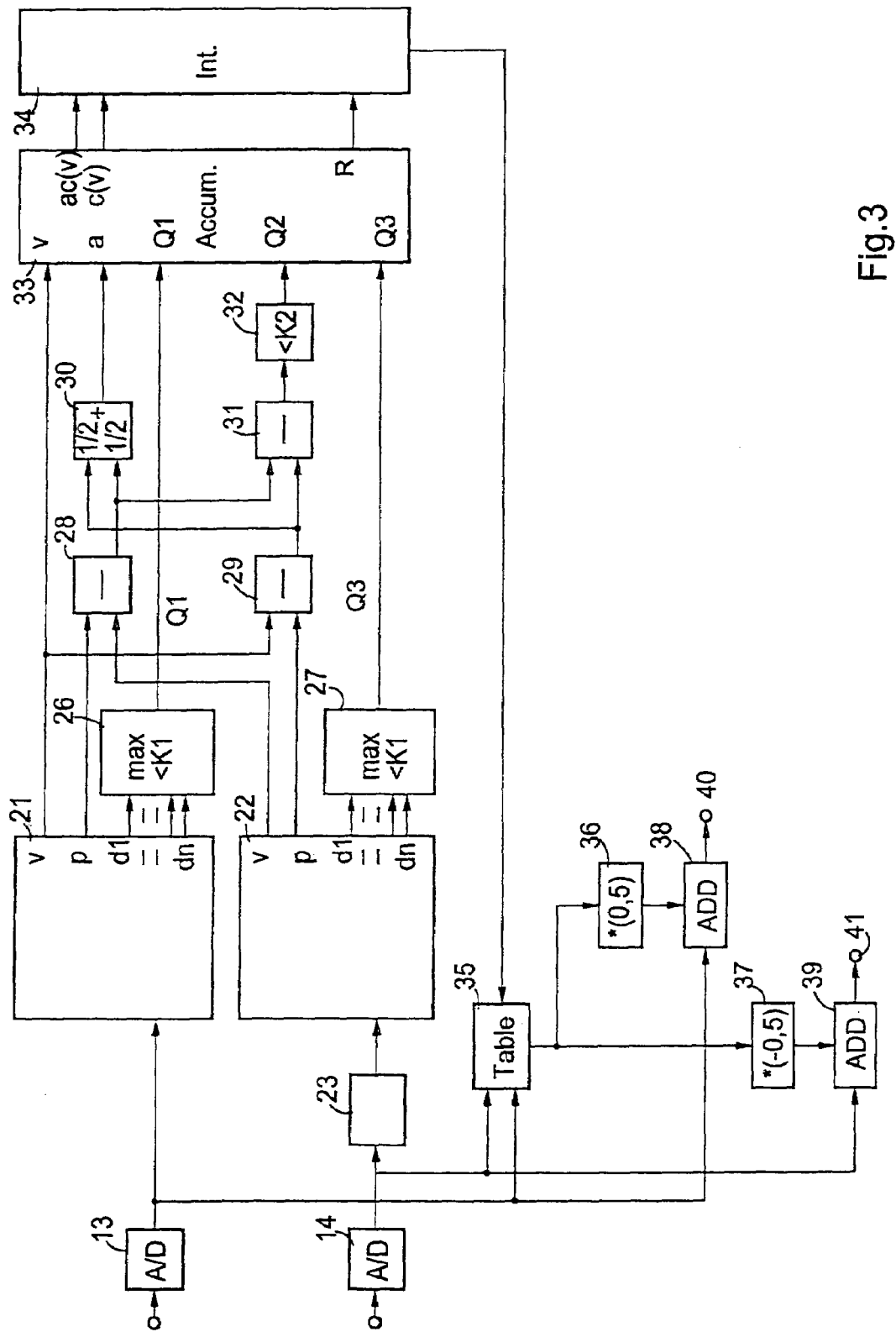
FIG. 3 shows a block diagram of an arrangement for carrying out the method according to the invention.

At the outputs of the registers 4, 5, 6, 7 there are analogue amplifiers 8, 9, 10, 11, from the outputs of which the signals are fed to analogue/digital converters 13, 14 (FIG. 3).

The transfer characteristics of the segments 2, 3 and of the downstream circuits 4 to 11 differ from one another due to manufacturing tolerances. These differences may concern nonlinearities, gain factors or offsets and are essentially visible at the boundary 12 of the two segments 2, 3.

Figure 2:
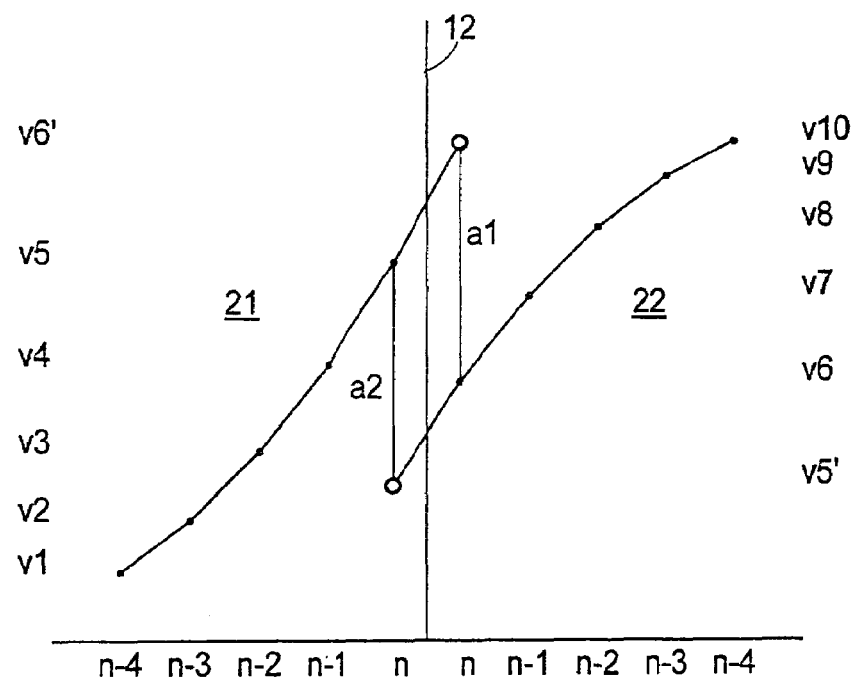
FIG. 2 shows a diagram with values of pixels on both sides of the boundary.

In order to correct these errors, two predictor filters 21, 22—also called predictor for short hereinafter—are provided in the exemplary embodiment according to FIG. 3. An exemplary embodiment of a predictor is specified in FIG. 4. The method of operation of the predictors is explained with the aid of the diagram in accordance with FIG. 2. Both filters evaluate pixels in the vicinity of the boundary 12 (FIG. 1), the predictor 21 evaluating the (temporally) last pixels of the first segment 2 and the predictor 22 evaluating the first pixels of the second segment 3. In order to enable a conclusion to be drawn about the last pixel of the first segment with the aid of the predictor 22, a buffer memory 23 (FIG. 3) is connected upstream of the predictor 22, which buffer memory performs a temporal interchanging of the pixels 1 to n.

It shall be assumed that five pixels with the values v1, v2, v3, v4 and v5 are read from the segment 2 (FIG. 1) before the boundary 12. From the profile of these values, the value of the first pixel v6' lying after the boundary 12 is deduced. Since this value is only estimated, it is represented as a circle in FIG. 3 in contrast to the rest of the values, which are represented by circular discs.

The illustration likewise shows five of the signals read from the segment 3, namely the pixels numbered n to n−4, but in a temporally interchanged order. The values of these pixels are specified by v6 to v10. Since no jump is to be assumed at the boundary 12 in the case of the video signal profiles illustrated, the difference v6'-v6 can be regarded as an error.

Influences governed by the picture content are minimized by continuous application of the estimations and of the calculations of the difference v6'-v6 and averagings of this difference. Moreover, differences v6'-v6 are not used for forming the correction signal if these differences or one of the differences between the preceding pixels is greater than a predetermined value. This predetermined value is somewhat greater than the maximum expected error. It is thus possible to prevent grossly incorrect estimations at jumps of the video signal.

The accuracy can be improved in that, with the aid of the predictor 22 (FIG. 3), the values v6 to v10 are used to estimate the value v5' of the last pixel lying before the boundary 12. The difference is likewise formed between said value v5' and the actual value v5. Averaging the two differences produces a more accurate measure of the deviation.

The deviations determined upon each pass through the boundary 12 are continuously averaged separately according to amplitude levels, so that after some time a histogram is produced which largely represents the differences in the transfer characteristics of the two segments from temporal and spatial conditions of the picture content.

In order to produce the histogram, in accordance with FIG. 3, the procedure is as follows. As already mentioned, the predictors 21, 22 generate an estimated value p for the pixel respectively lying on the other side of the boundary, a propagation-time-adapted value v of the video signal and difference values d between the individual pixels. The difference values d are fed to comparators 26, 27, which respectively generate an enable signal Q1, Q2 for the further processing only when the largest difference value d is less than the predetermined value K1.

The estimated values p and the values v are forwarded crosswise to a respective subtractor 28, 29, at the output of which the difference values a1 and a2 are present. The latter are fed to an averaging unit 30, the output of which carries the average value a from the difference values a1 and a2. Moreover, the difference values a1 and a2 pass to a further subtractor 31 followed by a comparator 32. The latter forwards an enable signal Q3 only when the difference between the two difference values a1 and a2 is less than a predetermined value. This likewise prevents signal profiles which are not suitable for an estimation in the sense of the invention from being used to form the correction signals.

The value v, the average a of the difference values and the enable signals Q1 to Q3 are forwarded to an accumulator 33, which accumulates the average values a separately for each range of values of v if the enable signals Q1 to Q3 are present. In this case, the frequency of occurrence is furthermore counted depending on the range of values of v.

In a subsequent accumulator 34, all a are accumulated separately according to values v. Moreover, the number c of accumulated a is counted for each value v. Only those a for which the enable signals Q1 to Q3 are present participate in this.

The accumulated values ac(v) and the associated counts c(v) are transmitted to an interpolator 34, in which the values ac(v) respectively divided by c(v) are interpolated to produce a correction curve from which random discontinuities have been eliminated. Values ac(v) for which c(v) is less than a predetermined limit value are not taken into account in this case. The interpolated values are stored in a table 35 under addresses corresponding to the values v.

In order to correct the values read from the segments 2, 3 (FIG. 1), said values are then fed as addresses to the table 35, whereby the correction values stored under the respective address are then added to the signals in a manner correct in respect of sign by means of a respective multiplier 36, 37 and an adder 38, 39. Corrected video signals are then available at the outputs 40, 41.

Figure 4:
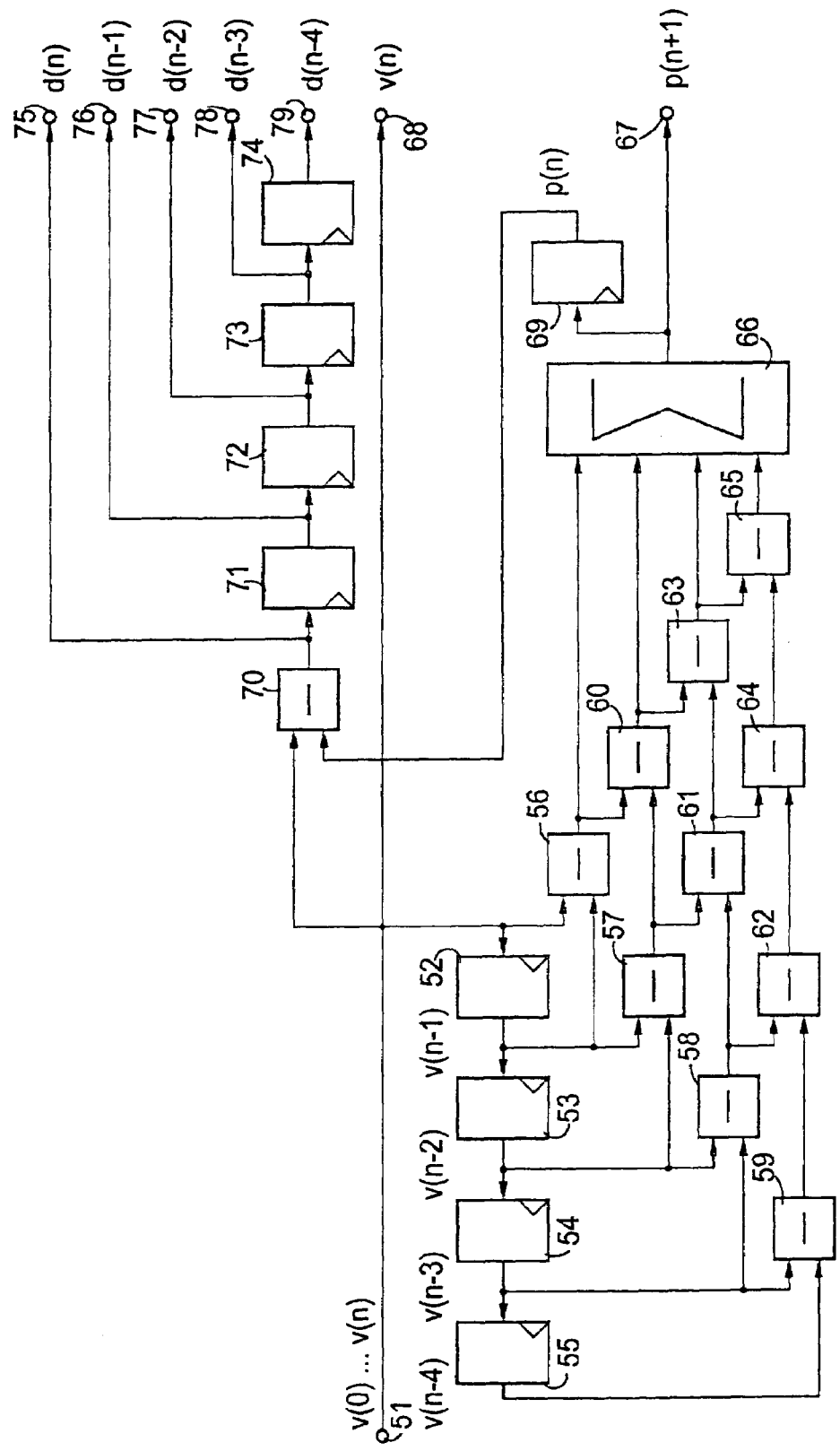
FIG. 4 shows a block diagram of a predictor used in the invention.

FIG. 4 shows a predictor in which the digital video signals arriving at an input 51 are delayed in each case by a pixel period with the values v(0) to v(n) with the aid of registers 52 to 55 clocked with the pixel clock. The difference is formed in each case between two successive values with the aid of subtractors 56 to 59. Further subtractors 60, 61, 62 in turn form differences from the differences. This process is continued with the subtractors 63 and 64 and a final subtractor 65. In a summing circuit 66, the output signals of the subtractors 56, 60, 63, 65 are summed and the sum is fed to an output 67 as estimated value p(n+1). Moreover, the video signal is forwarded unchanged to an output 68. The value v(n) is available at the point in time considered.

The estimated value p(n+1) is forwarded to a subtractor 70 after having been delayed by a pixel period at 69 and is subtracted from v(n) at said subtractor. This produces a difference value d(n), which can be taken from the output 75. Through delays 71 to 74, the preceding differences are made available at the outputs 76 to 79.

What is claimed is:

1. A method for the correction of video signals whose processing is distributed between a plurality of segments having different transfer characteristics, comprising:

from values of a predetermined number of pixels before the boundary of two segments, estimating the value of at least one pixel spatially located behind the boundary, and deriving correction values from differences between the at least one estimated value and an actual value of at least one pixel spatially located at the position of the at least one estimated pixel that lies behind the boundary in the neighboring segment.

2. The method according to claim 1, wherein only differences which do not exceed a predetermined value are used for forming the correction values.

3. The method according to claim 2, wherein the differences are only used for forming the correction values if differences in the values of the predetermined number of pixels before the boundary are less than a predetermined value.

4. The method according to claim 1, wherein the differences, for the purpose of forming the correction values, are averaged separately according to the respective values of the video signals.

5. The method according to claim 1, wherein the temporal order of the predetermined number of pixels after the boundary of two segments is interchanged in each case, in that the value of the at least one last pixel before the boundary is estimated from the interchanged values, in that further differences are formed from the value estimated for the at least one last pixel lying before the boundary and the actual value of the at least one last pixel lying before the boundary, in that an average value is in each case formed from the differences and the further differences, and in that the correction value is derived from the average values.

6. The method according to claim 5, wherein the differences and the further differences are in each case subtracted from one another, and in that the respective average value of the differences is only used for correction if the value produced by subtraction of the difference and the further difference is less than a further predetermined value.

7. The method according to claim 5, wherein the average values of the differences, for the purpose of forming the correction values, are averaged separately according to the respective values of the video signals.

8. The method according to claim 6, wherein the average values of the differences, for the purpose of forming the correction values, are averaged separately according to the respective values of the video signals.

9. The method according to claim 1, wherein the correction values are written to a memory, and in that the correction values, depending on the respective values of the video signals of at least one segment to be corrected, are read from the memory and applied to the video signals of the at least one segment to be corrected.

10. The method according to claim 1, wherein the correction values are written to a memory, and in that the correction values, depending on the respective values of the video signals, are read from the memory and added half each with an opposite sign to the values of the video signals of the adjoining segments.

11. The method of claim 1, wherein the estimating step includes:

forming a first derivative of the video signal by difference formation between values of in each case two adjacent pixels of n pixels, forming a second derivative by difference formation of the values of the first derivative, up to a (n−1)th derivative, and adding the values of all the derivatives for forming the estimated value for a following pixel.

* * * * *